June 17, 1952     D. E. WILSON     2,600,718
SPROUTING APPARATUS DEVICE

Filed April 18, 1950     2 SHEETS—SHEET 1

INVENTOR.
David E. Wilson

June 17, 1952 D. E. WILSON 2,600,718
SPROUTING APPARATUS DEVICE
Filed April 18, 1950 2 SHEETS—SHEET 2
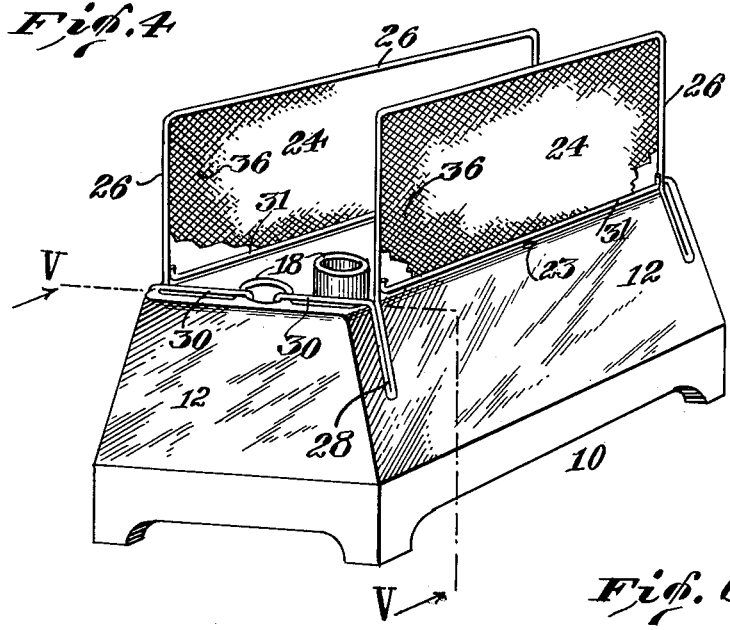
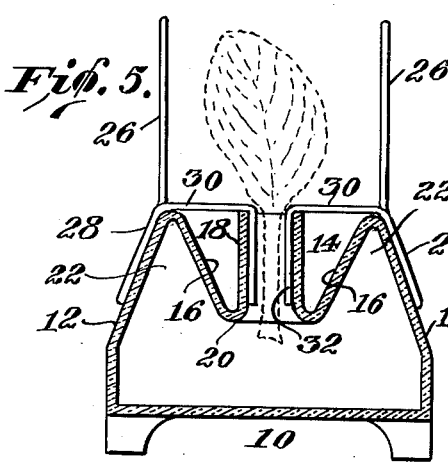
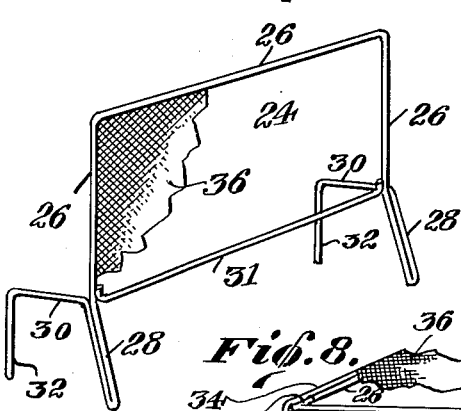
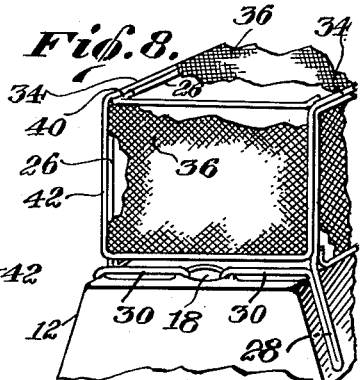
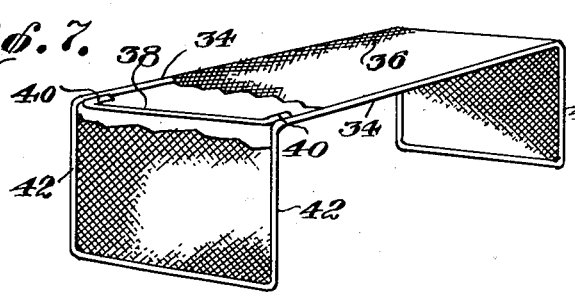
INVENTOR.
David E. Wilson Patented June 17, 1952

2,600,718

UNITED STATES PATENT OFFICE 2,600,718

SPROUTING APPARATUS DEVICE

David E. Wilson, Arlington, Va.

Application April 18, 1950, Serial No. 156,600

5 Claims. (Cl. 47—1.2)

My invention relates in general to improvement in sprouting apparatus and has more particular reference to a device designed to facilitate the rooting or sprouting of roots or radicle rootlets from the stem of plants that may be rooted by continuous immersion in water.

A further object of the invention is to design a device to accommodate a plurality of plant stems at the same time, each plant stem being securely supported in a tubular transparent holder which will provide free access to the light and sun rays, so beneficial in the propagating of the radicel or rootlets from the stems of the plants.

A further object of the invention is to provide a means of maintaining a sufficient water level at all times in the transparent tubular holders in order that the plant stems may be kept in a constant state of submersion.

A further object of my invention is to provide inclined side walls of sufficient height with respect to the top of the transparent tubular members to allow the water level within the apparatus to reach approximately the top of the transparent tubular members thus keeping the stems covered with water at all times during the period of propagation.

Another object of the invention is to provide means to adjust the sprouting apparatus to varying light conditions such as shielding the plant stems from too much sunlight; this is accomplished by providing gauze covered wire frames to be mounted on the rim of the sprouting apparatus.

Another object of the invention is to provide means for protecting the sprouting leaf stems from the cold night air or drafts, by providing a top covering member consisting of a wire frame having a flat top side and downturned end members to which gauze is attached by any suitable means, preferably by cementing. Said top covering member with its downturned ends is placed over and rests on the upper edge of the side gauze covered wire frames which are mounted on the rim of the sprouting apparatus when it is desired to enclose the plant stems completely.

With these and other objects in view the invention will now be described with reference to the accompanying drawings and will be pointed out in the appended claims.

Fig. 4 is a perspective view similar to Fig. 1, showing the protecting gauze covered side frames and the manner of attaching same to the sprouting apparatus.

Fig. 5 is a sectional view taken on line V—V of Fig. 4 showing manner of attaching gauze covered side frames to the sprouting apparatus.

Fig. 6 is a perspective view of one of the gauze covered side frames.

Fig. 7 is a perspective view of the top and end covering section to be mounted on the side frames in the position shown in Fig. 4, when it is desired to completely enclose the channel portion of the sprouting apparatus.

Fig. 8 is a fragmental perspective view showing the manner of attaching the top and end frame to the gauze covered side frame.

Figure 1:
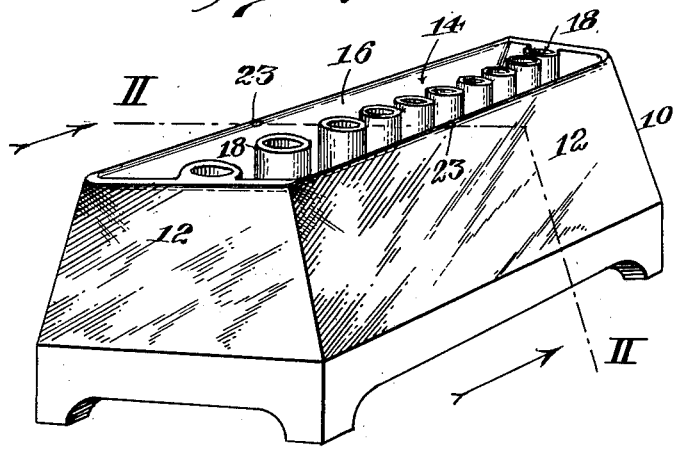
Fig. 1 is a perspective view of my sprouting apparatus showing a plurality of transparent tubes in horizontal alignment extending upward in vertical position from the base of a V-shaped channel formed in the upper central portion of the sprouting apparatus.
Figure 2:
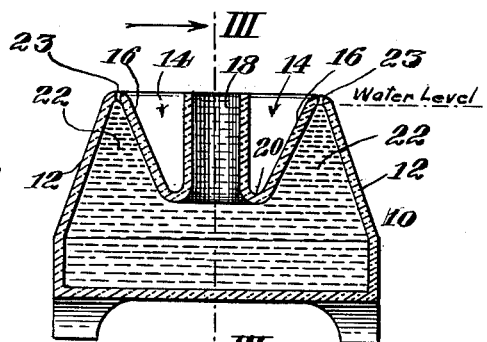
Fig. 2 is a cross section taken along line II—II of Fig. 1.
Figure 3:
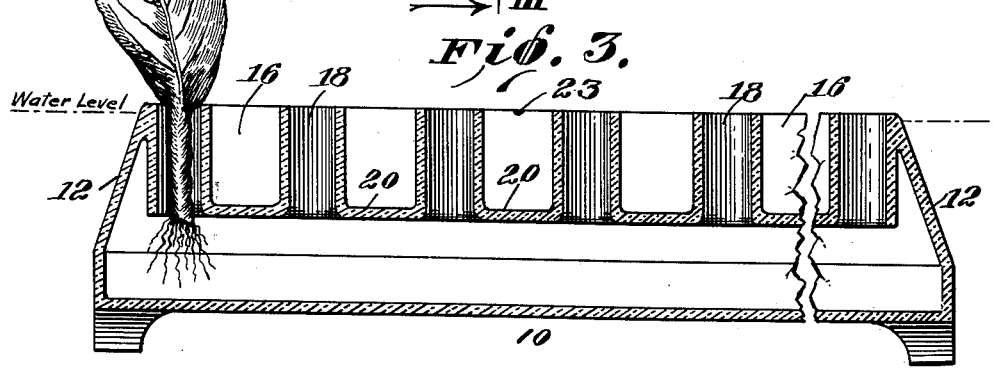
Fig. 3 is a longitudinal sectional view of the sprouting apparatus, showing the position of a leaf and its stem in one of the tubular transparent holders and the integral formation of the said tubular holders with the base of the V-shaped channel.

The embodiment shown in the drawings to illustrate my invention comprises a rectangular shaped glass or transparent plastic body 10 having inclined sides 12 which form the sides and ends of the sprouting apparatus. A V-shaped channel 14 formed within the central portion of the body 10 by the inclined walls 16, runs longitudinally throughout the length of the body 10, said inclined walls terminating at the bottom of the V-shaped channel into a base 20, said base 20 forms a support for the equally distant spaced vertical tubes 18, which are integral with said base, said vertical tubes form holders for the stems of the leaves during the period of propagation.

The inclined inside walls forming the V-shaped channel and the inclined sides of the body meet at the rim of the channel 14 and form a water compartment 22 on each side of the central row of vertical tubes 18, said water compartments are provided with vent holes 23 at their upper rim portions to permit the air to escape when filling the propagating apparatus to capacity. When the water reaches the top of the compartment 22 the transparent vertical tubes 18 will have the same water level and be approximately full. This is very important in the process of propagation as it is necessary to keep the stems submerged in water to their full length.

The gauze covered side frames which I have designated as 24, on the drawing comprises an oblong shaped wire frame 26 having downwardly extending arms 28 which are formed by the continuation of the wire forming the frame 26. Said arm 28 rests against the inclined side 12 of the sprouting apparatus, forming a supporting means against displacement of said gauze covered side frames. The wire forming said downwardly extending arm, is bent back and continues in a horizontal position as shown at numeral 30 on the drawing, across the top of the sprouting apparatus as far as the inside edge of the vertical end tube, at which point it is bent down in a vertical position as indicated at 32 on the drawing. When said wire is inserted in the vertical end tube it provides a substantial holding means for securing the gauze covered side frames to the sprouting apparatus. The gauze covered side frames 24 are suitably braced at the bottom by a longitudinal member 31 having upturned ends which are soldered to the frame and form one of the long sides of said frame.

The top and end cover section shown in the drawings as Fig. 7, comprises an oblong frame 34, said frame is covered with gauze 36 and is braced against distortion by a cross member 38 having turned ends 40 which are soldered to the turned down portion of the frame as designated by the numeral 42.

As a result of research and experimentation it is found apparent that in propagating radicel or rootlets from plant stems (especially the type commonly known as African violets) the advantages and benefits derived from the design as set forth, such as transparent tubes to hold the stems of the plants permitting the direct rays of the sun to strike the plant stems when it is desired, means for maintaining a uniform water level in all of the tubes, also means for shielding the plant stems from the sun when the rays are too strong and means for protecting the plant stems from cold air when necessary by enclosing the plants with gauze screens. All of the foregoing enumerated features contribute and are conducive to the propagation of strong healthy radicel or roots on the plant stems.

It will be obvious that while I have disclosed a single row of transparent vertical tubes in the drawings, to increase the production of the propagating apparatus it is only necessary to design the device with any number of rows of tubes to meet the requirements of the florist or hothouse trade.

While I have shown and described the preferred embodiment of my invention, it will be understood that minor changes in the construction, combination and arrangement of parts may be made without departing from the spirit and scope of the invention as claimed.

Having thus described my invention what I claim as new and desire to secure by Letters Patent is as follows:

I claim:

1. In a propagating apparatus, a transparent oblong body having inclined sides and ends, a substantially V-shaped channel portion having a bottom and inclined side walls disposed in the upper half of said oblong body and containing therein a plurality of vertical transparent tubes integral with said base of the V-shaped channel and equally spaced the full length of the V-shaped channel and designed to hold the stems of plant leaves, a pair of vertically disposed gauze covered wire frames, detachably mounted in parallel relation to each other on the rim of said oblong body; a gauze covered wire frame consisting of a top side and turned down end members shaped to fit over said first named vertically disposed gauze covered wire frames, all of said frames in combination providing a suitable enclosure for the plant leaves.

2. A propagating apparatus as set forth in claim 1, each vertical transparent tube being integral with the base of said V-shaped channel and extending upward from said base to a position level with the rim portion of said oblong body whereby said transparent tube incases a plant stem and holds its attached rootlets submerged in water to be exposed to sunlight in the process of propagating.

3. A propagating apparatus as set forth in claim 1, said rim of the oblong transparent body being formed by the junction of the wall of the V-shaped channel and the wall of the oblong body, and being provided with a vent hole at the extreme upper part of said rim to permit the escape of air when filling the apparatus whereby water will rise to the height of the vent hole and also to the top of the vertical transparent tubes in the V-shaped channel.

4. A propagating apparatus as set forth in claim 1, each gauze covered wire frame detachably mounted in parallel relation to each other on the rim of said oblong body being oblong in form and having downwardly extending wire arms at its outer ends shaped to contact the inclined outer surface of the body portion of the propagating apparatus, a continuation of said downwardly extending wire arms spanning the space from the rim portion of the oblong body to the inner circumference of the end vertical tubes, where said arms are bent at right angles to enter said tubes and to provide a means for securing the gauze covered wire frames to said oblong body.

5. A propagating apparatus as set forth in claim 1, the oblong gauze covered wire frame consisting of a flat top portion lying in a horizontal plane, downwardly extending end members lying in a vertical plane, said downwardly extending end members bent at right angles to said top and being thus perpendicular thereto, said oblong gauze covered wire frame at its bending points being provided with suitable cross members to hold said gauze covered wire frame against distortion, said oblong gauze covered wire frame providing protection for the propagating plants when fitted over the said side frame members.

DAVID E. WILSON.

REFERENCES CITED

The following references are of record in the file of this patent:

UNITED STATES PATENTS

| Number | Name | Date |
|---|---|---|
| 2,205,303 | Munsell | June 18, 1940 |